United States Patent
Fang et al.

(10) Patent No.: US 11,265,957 B2
(45) Date of Patent: **\*Mar. 1, 2022**

(54) PHYSICAL LAYER SPLIT IN A MULTI-RADIO ACCESS TECHNOLOGY (RAT) CENTRAL UNIT (CU)

(71) Applicant: T-MOBILE INNOVATIONS L.L.C., Overland Park, KS (US)

(72) Inventors: Zheng Fang, McLean, VA (US); Zheng Cai, Fairfax, VA (US); Yu Wang, Fairfax, VA (US)

(73) Assignee: Sprint Communications Company L.P., Overland Park, KS (US)

(*) Notice: Subject to any disclaimer, the term of this patent is extended or adjusted under 35 U.S.C. 154(b) by 79 days.

This patent is subject to a terminal disclaimer.

(21) Appl. No.: 16/798,055

(22) Filed: Feb. 21, 2020

(65) Prior Publication Data
US 2020/0196377 A1 Jun. 18, 2020

Related U.S. Application Data

(63) Continuation of application No. 16/052,134, filed on Aug. 1, 2018, now Pat. No. 10,631,358.

(51) Int. Cl.
*H04W 76/27* (2018.01)
*H04B 7/0456* (2017.01)
(Continued)

(52) U.S. Cl.
CPC .......... *H04W 76/27* (2018.02); *H04B 7/0473* (2013.01); *H04L 27/265* (2013.01);
(Continued)

(58) Field of Classification Search
CPC ..... H04W 76/27; H04W 76/11; H04W 84/12; H04B 7/0473; H04L 27/2628; H04L 61/6022; H04L 27/265
See application file for complete search history.

(56) References Cited

U.S. PATENT DOCUMENTS 9,775,045 B2 9/2017 Li et al.
2014/0355444 A1 12/2014 Turtinen et al.
(Continued)

FOREIGN PATENT DOCUMENTS

WO 2018044358 A1 3/2018
WO 2018063998 A1 4/2018

OTHER PUBLICATIONS

Katerina Smiljkovikj, et al.; "Capacity Analysis of Decoupled Downlink and Uplink Access in 5G Heterogeneous Systems;" Oct. 27, 2014; pp. 1-26; arXiv:1410.7270v1 [cs.NI].
(Continued)

*Primary Examiner* — Dady Chery (57) ABSTRACT

A Central Unit (CU) receives Fifth Generation Core (5GC) N2 signaling and generates Fifth Generation New Radio (5GNR) RRC signaling. The CU receives 5GC N1 signaling. The CU converts a first portion of the 5GNR RRC signaling into LTE RRC signaling and converts a first portion of the 5GC N1 signaling into LTE Non-Access Signaling (NAS). The CU transfers LTE Physical Layer High (PHY-H) signaling to an LTE Physical Layer Low (PHY-L) in an LTE Distributed Unit (DU). The CU transfers 5GNR PHY-H signaling to an 5GNR PHY-L in a 5GNR DU. The LTE DU receives the LTE PHY-H signaling and transfers the LTE RRC signaling and the LTE NAS signaling to LTE User Equipment (UE). The 5GNR DU receives the 5GNR PHY-H signaling and transfers the second portion of the 5GNR RRC signaling and the second portion of the 5GC N1 signaling to a 5GNR UE.

20 Claims, 9 Drawing Sheets

(51) Int. Cl.
    *H04L 27/26*      (2006.01)
    *H04W 76/11*      (2018.01)
    *H04L 101/622*      (2022.01)
    *H04W 84/12*      (2009.01)

(52) U.S. Cl.
    CPC ...... *H04L 27/2628* (2013.01); *H04L 61/6022* (2013.01); *H04W 76/11* (2018.02); *H04W 84/12* (2013.01)

(56) References Cited

U.S. PATENT DOCUMENTS

| | | |
|---|---|---|
| 2015/0230248 A1 | 8/2015 | Kim et al. |
| 2017/0026880 A1 | 1/2017 | Cao et al. |
| 2017/0245316 A1 | 8/2017 | Salkintzis |
| 2017/0331670 A1 | 11/2017 | Parkvall et al. |
| 2017/0373740 A1 | 12/2017 | Guo et al. |
| 2018/0007583 A1 | 1/2018 | Hong et al. |
| 2018/0091968 A1 | 3/2018 | Ly et al. |
| 2018/0270700 A1 | 9/2018 | Babaei et al. |
| 2018/0376380 A1 | 12/2018 | Leroux |
| 2019/0158137 A1* | 5/2019 | Brunel ............... H04B 1/04 |

OTHER PUBLICATIONS

Erik Westerberg; "4G/5G RAN architecture: How a Split Can Make the Difference;" Ericsson Technology Review; Jul. 22, 2016; pp. 1-16; vol. 93; Ericsson AB; Stockholm, Sweden.

Alfoudi, et al.; "Mobility Management Architecture in Different RATs Based Network Slicing"; 2018 32nd International Conference on Advanced Information Networking and Applications Workshops; 2018; pp. 270-274; IEEE.

Stohr, et al.; "Multi RAT (WiFi/LTE/5G) Mobile Network featuring RoF Fronthaul, 60 GHz Beam-Switching and Mobile IP"; Invited Paper; 2018; pp. 1-3.

\* cited by examiner

PHYSICAL LAYER SPLIT IN A MULTI-RADIO ACCESS TECHNOLOGY (RAT) CENTRAL UNIT (CU)

RELATED CASES

This United States Patent Application is a continuation of U.S. patent application Ser. No. 16/052,134 that was filed on Aug. 1, 2018 and is entitled, "PHYSICAL LAYER SPLIT IN A MULTI-RADIO ACCESS TECHNOLOGY (RAT) CENTRAL UNIT (CU)." U.S. patent application Ser. No. 16/052,134 is hereby incorporated by reference into this United States Patent Application.

TECHNICAL BACKGROUND

Wireless data networks serve wireless User Equipment (UEs) with mobile data communication services like internet access, voice calling, and video calling. The wireless UEs could be computers, phones, headsets, graphic displays, vehicles, drones, or some other wireless communication apparatus. The wireless data networks have wireless access points that exchange user data and signaling over the air with these wireless UEs. The wireless access points include Distributed Unit (DU) circuitry. The DU circuitry uses network protocols like Fifth Generation New Radio (5GNR), Long Term Evolution (LTE), and Institute of Electrical and Electronic Engineers 802.11 (WIFI). The DU circuitry executes network software applications to process the user data responsive to the signaling. The network software applications comprise: Physical Layer (PHY), Media Access Control (MAC), Radio Link Control (RLC), Packet Data Convergence Protocol (PDCP), and Radio Resource Control (RRC). These network software applications drive the DU circuitry to exchange wireless user data and signaling with the wireless UEs.

The network software applications also drive the DU circuitry to exchange user data and signaling with Central Unit (CU) circuitry. The CU circuitry is located in a data center between the DU circuitry in the wireless access points and the wireless network core. The CU circuitry is often proximate to the DU circuitry, but the CU circuitry may be distant from the DU circuitry. The CU circuitry executes network software applications that drive the CU circuitry to exchange user data and signaling with the DU circuitry in the wireless access points and with the wireless network core.

With the introduction of protocol split technology, some of the network software applications are moved from the DU circuitry in the wireless access points to the CU circuitry in the data center. For example, the RRC and PDCP software applications have been moved from the DU circuitry in the wireless access points to the CU circuitry in the data center. In another example, the MAC, RLC, RRC, and PDCP software applications were moved from the DU circuitry in the wireless access points to the CU circuitry. In yet another example, the DU circuitry in the wireless access points host a lower PHY, and the CU circuitry hosts a higher PHY along with the MAC, RLC, PDCP, and RRC software applications.

In addition to protocol split, Uplink/Downlink (UL/DL) de-coupling technology is used to separate the DU and CU circuitry on the UL and/or the DL. Thus, a wireless UE may get its UL from DU circuitry in an LTE evolved NodeB and get its DL from DU circuitry in an 5GNR NodeB. Likewise, the UL for the wireless UE may traverse CU circuitry in one backhaul link, and the DL for the wireless UE may traverse different CU circuitry in another backhaul link.

Both LTE and WIFI may be used to access the same PDCP component using LTE/WIFI Aggregation (LWA). Both LTE and 5GNR may be used to access the same CU circuitry using a 5GNR Non-Stand Alone (NSA) configuration. Unfortunately, the LTE PDCP component and the 5GNR PDCP component have not been optimized in CU circuitry that also hosts the higher PHYs to effectively and efficiently serve WIFI UEs, LTE UEs, and 5GNR UEs.

TECHNICAL OVERVIEW

A wireless network Central Unit (CU) receives Fifth Generation Core (5GC) N2 signaling and generates Fifth Generation New Radio (5GNR) RRC signaling. The CU receives 5GC N1 signaling. The CU converts a first portion of the 5GNR RRC signaling into LTE RRC signaling and converts a first portion of the 5GC N1 signaling into LTE Non-Access Signaling (NAS). The CU transfers LTE Physical Layer High (PHY-H) signaling to an LTE Physical Layer Low (PHY-L) in an LTE Distributed Unit (DU). The CU transfers 5GNR PHY-H signaling to an 5GNR PHY-L in a 5GNR DU. The LTE DU receives the LTE PHY-H signaling and wirelessly transfers the LTE RRC signaling and the LTE NAS signaling to an LTE User Equipment (UE). The 5GNR DU receives the 5GNR PHY-H signaling and wirelessly transfers the second portion of the 5GNR RRC signaling and the second portion of the 5GC N1 signaling to a 5GNR UE.

DETAILED DESCRIPTION

Figure 1:
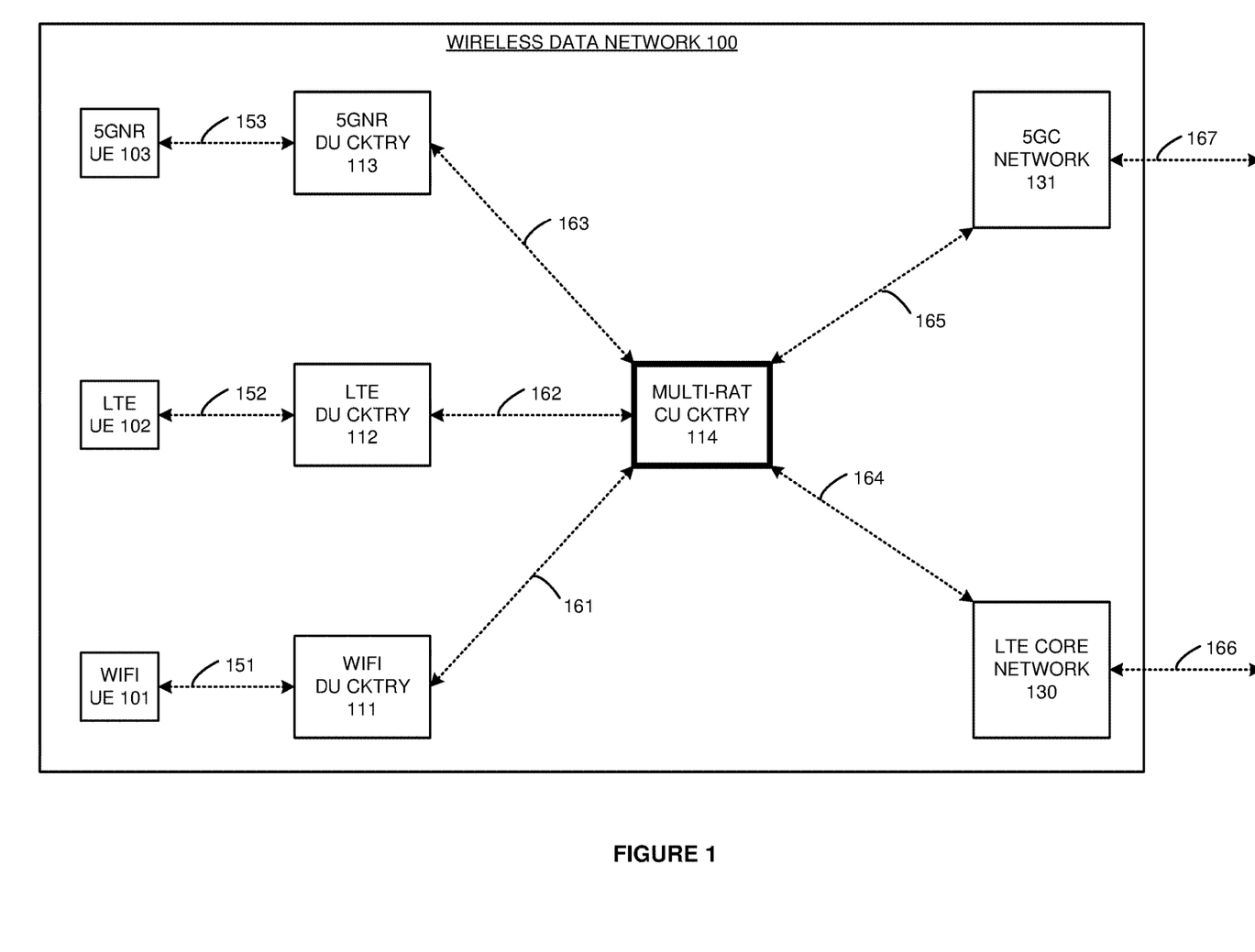
FIG. 1 illustrates a wireless data network that comprises multi-Radio Access Technology (RAT) Central Unit (CU) circuitry with a Physical Layer (PHY) split.

FIG. 1 illustrates wireless data network 100 that comprises multi-Radio Access Technology (RAT) Central Unit (CU) circuitry 114 with Physical Layer (PHY) split. Wireless data network 100 comprises User Equipment (UEs) 101-103, circuitry (CKTRY) 111-114, and core networks 130-131. Core networks 130-131 comprise Long Term Evolution (LTE) core network 130 and Fifth Generation Core (5GC) network 131. Circuitry 111-114 comprises Distributed Unit (DU) circuitry 111-113 and multi-RAT CU circuitry 114. DU circuitry 111-113 comprises Institute of Electrical and Electronic Engineers 802.11 (WIFI) DU circuitry 111, Long Term Evolution (LTE) DU circuitry 112, and Fifth Generation New Radio (5GNR) DU circuitry 113. Portions of DU circuitry 111-113 are often mounted at elevation to improve wireless signal quality for UEs 101-103. UEs 101-103 comprise WIFI UE 101, LTE UE 102, and 5GNR UE 103.

WIFI UE 101 and WIFI DU circuitry 111 wirelessly exchange user data and network signaling over wireless WIFI link 151. LTE UE 102 and LTE DU circuitry 112 wirelessly exchange user data and network signaling over wireless LTE link 152. 5GNR UE 103 and 5GNR DU circuitry 113 wirelessly exchange user data and network signaling over wireless 5GNR link 153. Multi-RAT CU circuitry 114 and DU circuitry 111-113 exchange user data and network signaling over respective data links 161-163. Multi-RAT CU circuitry 114 and core networks 130-131 exchange user data and network signaling over respective data links 164-165. Core networks 130-131 and various other systems like the internet exchange user data over respective data links 166-167. Communication links 151-153 are typically terrestrial wireless links although they may include wireless optical and wireless satellite portions. Wireless links 151-153 may also include intermediate wireless elements like relays, repeaters, and tethered UEs. Data communication links 161-167 may be wireless or wireline and may include intermediate network elements.

UEs 101-103 could be computers, phones, headsets, graphic displays, vehicles, drones, or some other wireless communication apparatus. UEs 101-103 execute user applications like video streaming, virtual reality, machine communications, and internet access. UEs 101-103 comprise wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The transceiver circuitry uses wireless network protocols like 5GNR, LTE, and WIFI. The baseband circuitry comprises Central Processing Unit (CPU) circuitry, memory circuitry, software, bus circuitry, and data communication circuitry. The software includes an operating system and modules for the PHY, Media Access Control (MAC), Radio Link Control (RLC), Packet Data Convergence Protocol (PDCP), Radio Resource Control (RRC), Service Data Application Protocol (SDAP) and the like.

DU circuitry 111-113 comprises wireless transceiver circuitry and baseband circuitry. The wireless transceiver circuitry comprises antennas, modulators, amplifiers, filters, digital/analog interfaces, DSPs, memory circuitry, firmware/software, and bus circuitry. The transceiver circuitry uses wireless network protocols like 5GNR, LTE, and WIFI. The baseband circuitry comprises CPU circuitry, memory circuitry, software, bus circuitry, and data communication circuitry. The software includes an operating system and modules for the lower PHY (PHY-L).

Multi-RAT CU circuitry 114 comprises data communication circuitry and data processing circuitry. The data communication circuitry comprises DSPs, memory circuitry, firmware/software, and bus circuitry. The data processing circuitry comprises CPU circuitry, memory circuitry, software, and bus circuitry. The software includes an operating system and modules for RRC modules, multi-RAT PDCP, RLC, MAC, and the higher PHY (PHY-H).

LTE core network 130 comprises network elements like Mobility Management Entities (MMEs), Home Subscriber Systems (HSS), Serving Gateways (S-GWs), Packet Data Network Gateways (P-GWs), Policy Charging Rules Functions (PCRFs), Internet Protocol Multimedia Subsystem (IMS) servers, and the like. 5GC network 131 comprises network elements like Access and Mobility Management Functions (AMFs), Authentication Server Functions (AUSFs), Unified Data Management (UDM), Policy Control Functions (PCFs), Session Management Functions (SMFs), Application Functions (AFs), User Plane Functions (UPFs), and possibly other networking functions.

For an LTE data session between LTE UE 102 and the internet, CU circuitry 114 receives LTE signaling from LTE core network 130. The LTE signaling comprises S1-MME signaling exchanged with an LTE MME. The LTE signaling may include Non-Access Stratum (NAS) messaging between LTE UE 102 and the LTE MME. CU circuitry 114 receives user data transferred by LTE UE 102 and user data transferred by LTE core network 130. CU circuitry 114 uses its LTE PHY-H, LTE MAC, LTE RLC, multi-RAT PDCP, and LTE RRC to exchange the user data between LTE UE 102 and data communication link 166 over LTE DU circuitry 112 and LTE core network 130.

For a 5GNR data session between 5GNR UE 103 and the internet, CU circuitry 114 receives 5GC signaling from 5GC network 131. The 5GC signaling may comprise N2 signaling exchanged with a 5GC Access and Mobility Management Function (AMF). The 5GC signaling may comprise N1 messaging exchanged between 5GNR UE 103 and the 5GC AMF. CU circuitry 114 receives user data transferred by 5GNR UE 103 and by 5GC network 131. CU circuitry 114 uses its 5GNR PHY-H, 5GNR MAC, 5GNR RLC, multi-RAT PDCP, and 5GNR RRC to exchange the user data between 5GNR UE 103 and data communication link 167 over 5GNR DU circuitry 113 and 5GC network 131.

For a WIFI/LTE data session between WIFI UE 101 and the internet, CU circuitry 114 receives LTE signaling from LTE core network 130. The LTE signaling may comprise S1-MME signaling exchanged with an LTE MME. CU circuitry 114 uses its WIFI PHY-H, WIFI MAC, WIFI RLC, multi-RAT PDCP, and LTE RRC to exchange the user data between WIFI UE 101 and data communication link 166 over WIFI DU circuitry 111 and LTE core network 130.

For a WIFI/5GNR data session between WIFI UE 101 and the internet, CU circuitry 114 receives 5GC signaling from 5GC network 131. The 5GC signaling may comprise N2 signaling exchanged with a 5GC AMF. CU circuitry 114 uses its WIFI PHY-H, WIFI MAC, WIFI RLC, multi-RAT PDCP, and 5GNR PDCP to exchange the user data between WIFI UE 101 and data communication link 167 over WIFI DU circuitry 111 and 5GC network 131.

For an LTE/5GNR data session between LTE UE 102 and the internet, CU circuitry 114 receives LTE signaling from LTE core network 130 and receives 5GC signaling from 5GC network 131. The LTE signaling may comprise S1-MME signaling and NAS messaging. The 5GC signaling may comprise N2 signaling exchanged with a 5GC AMF. CU circuitry 114 uses its LTE PHY-H, LTE MAC, LTE RLC, multi-RAT PDCP, and 5GNR RRC/SDAP to exchange the user data between LTE UE 102 and data communication link 167 over LTE DU circuitry 112 and 5GC network 131.

For a 5GNR/LTE data session between 5GNR UE 103 and the internet, CU circuitry 114 receives LTE signaling from LTE core network 130 and receives 5GC signaling from 5GC network 131. The LTE signaling may comprise S1-MME signaling exchanged with an LTE MME, and the 5GC signaling may comprise N2 signaling exchanged with a 5GC AMF. The 5GC signaling may include N1 messaging between 5GNR UE 103 and the 5GC AMF. CU circuitry 114 receives user data transferred by 5GNR UE 103 and user data transferred by LTE core network 130. CU circuitry 114 uses its 5GNR PHY-H, 5GNR MAC, 5GNR RLC, multi-RAT PDCP, and LTE RRC to exchange the user data between 5GNR UE 103 and data communication link 166 over 5GNR DU circuitry 113 and LTE core network 130.

Figure 2:
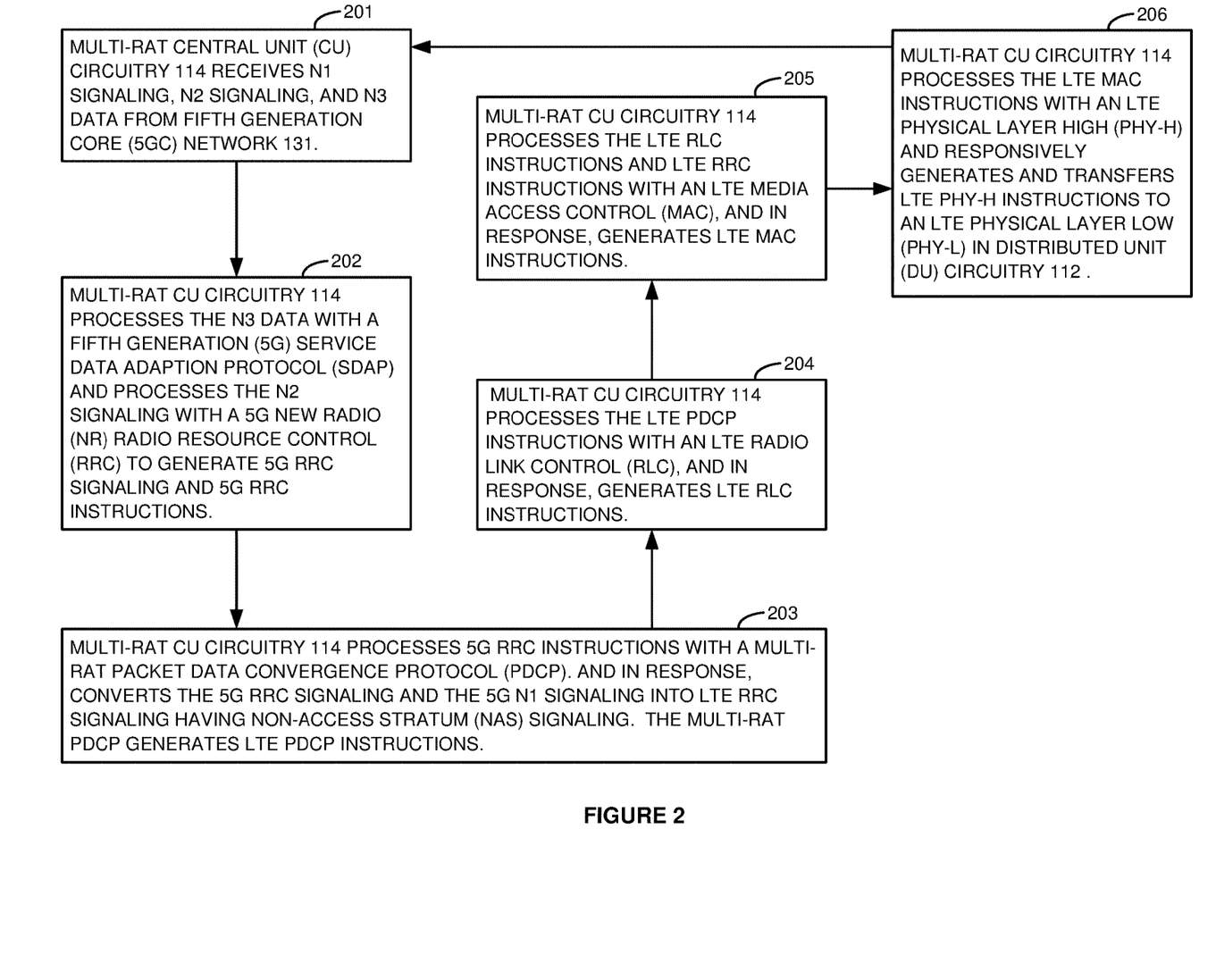
FIG. 2 illustrates the operation of the multi-RAT CU circuitry with a PHY split in the wireless data network.

FIG. 2 illustrates the operation of multi-RAT CU circuitry 114 with a PHY split in wireless data network 100. Multi-RAT CU circuitry 114 receives N1 signaling, N2 signaling, and N3 data from Fifth Generation Core (5GC) network 131 (201). In response, multi-RAT CU circuitry 114 processes the N3 data with a Fifth Generation (5G) Service Data Adaption Protocol (SDAP) and processes the N2 signaling with a 5G New Radio (NR) Radio Resource Control (RRC) to generate 5G RRC signaling and 5G RRC instructions (202).

Multi-RAT CU circuitry 114 processes a first portion of the 5G RRC instructions with a multi-RAT Packet Data Convergence Protocol (PDCP) (203). In response, multi-RAT CU circuitry 114 converts the 5G RRC signaling and N1 signaling into LTE RRC signaling having Non-Access Stratum (NAS) signaling. Multi-RAT CU circuitry 114 generates LTE PDCP instructions.

Multi-RAT CU circuitry 114 processes the LTE PDCP instructions with an LTE Radio Link Control (RLC). In response, multi-RAT CU circuitry 114 generates LTE RLC instructions (204). Multi-RAT CU circuitry 114 processes the LTE RLC instructions and a second portion of the LTE RRC instructions with an LTE Media Access Control (MAC) (205). In response, multi-RAT CU circuitry 114 generates LTE MAC instructions. Multi-RAT CU circuitry 114 processes the LTE MAC instructions with an LTE Physical Layer High (PHY-H). In response, multi-RAT CU circuitry 114 generates and transfers LTE PHY-H instructions to an LTE Physical Layer Low (PHY-L) in DU circuitry 112 (206). The process repeats (201). The LTE PHY-L in DU circuitry 112 will process the LTE PHY-H instructions and responsively transfer the RRC signaling with the NAS and the RRC user data to LTE UE 102.

Figure 3:
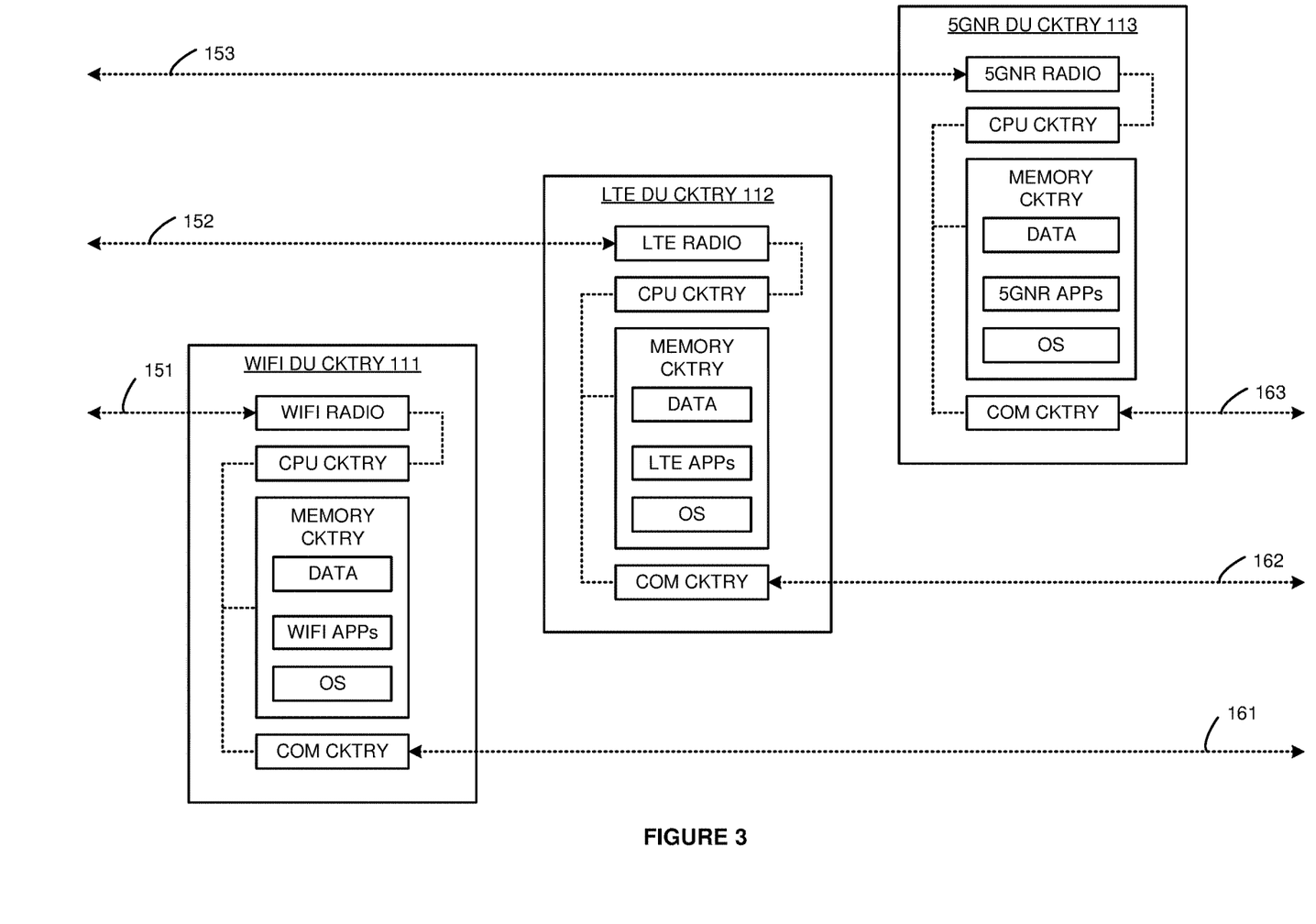
FIG. 3 illustrates multi-RAT Distributed Unit (DU) circuitry with a PHY split.

FIG. 3 illustrates Distributed Unit (DU) circuitry 111-113 with a PHY split. WIFI DU circuitry 111 comprises a WIFI radio, CPU circuitry, memory circuitry, and data corn circuitry that that are coupled over bus links. The WIFI radio comprises antennas, duplexers, modulators, filters, amplifiers, analog-to-digital converters, digital-to-analog converters, DSP circuitry, memory, and bus links. The radio memories store data and DSP firmware/software. In the radios, the DSP circuitry drives the wireless exchange of the data with wireless WIFI UE 101 over wireless link 151. The memory circuitry stores data, operating system software (OS), and WIFI software applications (APPs). The data corn circuitry supports communications over Ethernet, IP, and the like. The CPU circuitry executes the operating system and WIFI applications to control the exchange of the data between WIFI UE 101 and multi-RAT CU circuitry 114 over communication links 151 and 161.

LTE DU circuitry 112 comprises an LTE radio, CPU circuitry, memory circuitry, and data corn circuitry that that are coupled over bus links. The LTE radio comprises antennas, duplexers, modulators, filters, amplifiers, analog-to-digital converters, digital-to-analog converters, DSP circuitry, memory, and bus links. The radio memories store data and DSP firmware/software. In the radios, the DSP circuitry drives the wireless exchange of the data with wireless LTE UE 102 over wireless link 152. The memory circuitry stores data, operating system software, and LTE software applications. The data corn circuitry supports communications over Ethernet, IP, and the like. The CPU circuitry executes the operating system and LTE applications to control the exchange of the data between LTE UE 102 and multi-RAT CU circuitry 114 over communication links 152 and 162.

5GNR DU circuitry 113 comprises a 5GNR radio, CPU circuitry, memory circuitry, and data corn circuitry that that are coupled over bus links. The 5GNR radio comprises antennas, duplexers, modulators, filters, amplifiers, analog-to-digital converters, digital-to-analog converters, DSP circuitry, memory, and bus links. The radio memories store data and DSP firmware/software. In the radios, the DSP circuitry drives the wireless exchange of the data with wireless 5GNR UE 103 over wireless link 153. The memory circuitry stores data, an OS and 5GNR software applications. The data com circuitry supports communications over Ethernet, IP, and the like. The CPU circuitry executes the operating system and 5GNR applications to control the exchange of the data between 5GNR UE 103 and multi-RAT CU circuitry 114 over communication links 153 and 163.

In the radios of DU circuitry 111-113, the antennas receive wireless UL signals over wireless links 151-153 and transfer corresponding electrical UL signals through duplexers to amplifiers. The amplifiers boost the UL signals for filters which attenuate unwanted energy. Demodulators down-convert the UL signals from their carrier frequencies. Analog-to-Digital circuits convert the analog UL signals into digital UL signals for the radio DSP circuitry. The radio DSP circuitry recovers UL data and signaling from the UL signals and transfers the recovered UL data and signaling to the memory circuitry. The CPU circuitry executes the OS to process UL data and signaling in the memory circuitry through the various network applications. The executing network applications direct the CPU circuitry to transfer UL data and signaling through the data com circuitry and communications links 161-163 to multi-RAT CU circuitry 114.

In the data com circuitry of DU circuitry 111-113, the data com circuitry receives DL data and signaling from multi-RAT CU circuitry 114 over communication links 161-163. The CPU circuitry executes the OS to process DL data and signaling through the network applications. The network applications direct the CPU circuitry to transfer DL data and signaling from the memory circuitry to the radios for wireless delivery to UEs 101-103. In the radios, the DSP circuitry retrieves the DL data and signaling and transfers corresponding DL signals to the Digital-to-Analog converters. The Digital-to-Analog converters convert the DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to UEs 101-103 over wireless links 151-153.

Figure 4:
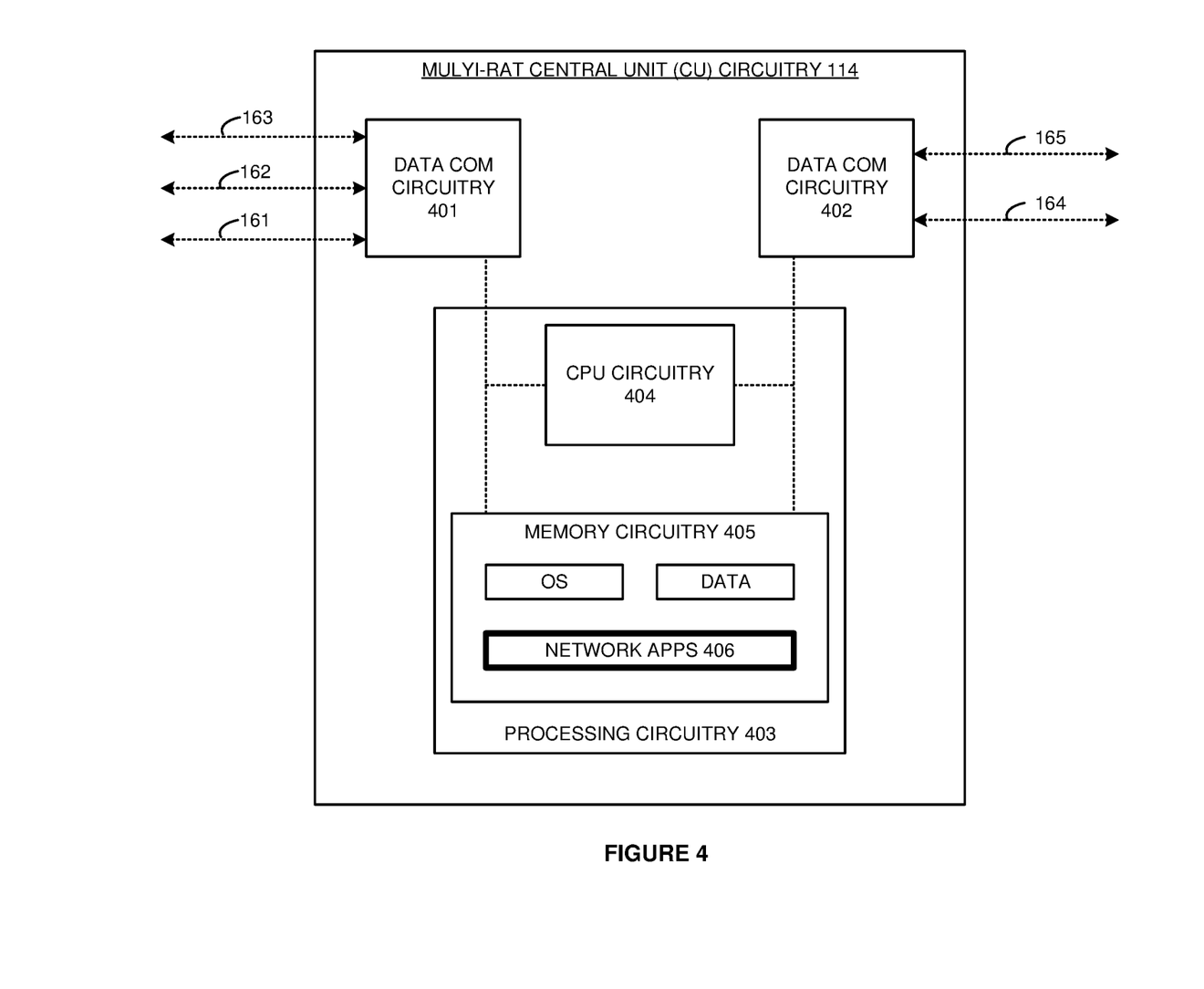
FIG. 4 illustrates the multi-RAT CU circuitry with a PHY split.

FIG. 4 illustrates the multi-RAT CU circuitry 114 with a PHY split. CU circuitry 114 comprises data com circuitry 401-402 and processing circuitry 403. Processing circuitry 403 comprises CPU circuitry 404, memory circuitry 405, and bus interfaces. Data com circuitry 401-402 supports Ethernet, IP, X2, S1-MME, S1-U, N1, N2, and the like. Memory circuitry 405 stores operating system software, data, and network applications 406. In CU circuitry 114, the CPU circuitry executes the operating system and network applications 406 to control the exchange of the data and signaling between DU circuitry 111-113 and core networks 130-131. Network applications 406 comprise PHY-H, MAC, RLC, multi-RAT PDCP, RRC, and SDAP modules.

In multi-RAT CU circuitry 114, data com circuitry 401 receives UL data and signaling over data links 161-163 from DU circuitry 111-113. Data com circuitry loads the UL RRC and NAS from communication links 162 in memory circuitry 405. Data com circuitry 401 loads the UL RRC and N1 from communication links 163 in memory circuitry 405. CPU circuitry 404 executes the operating system to process the UL data and signaling through network applications 406. Network applications 406 direct CPU circuitry 405 to transfer the UL data from memory circuitry 405 over data com circuitry 402 to links 164-165.

In multi-RAT CU circuitry 114, data com circuitry 402 receives DL data and signaling over data links 164-165 from core networks 130-131. Data com circuitry 402 loads the DL S1-U, S1-MME, and NAS from communication link 164 in memory circuitry 403. Data com circuitry 402 loads the DL N1, N2, and N3 from communication link 165 in memory circuitry 403. CPU circuitry 404 executes the operating system to process this DL data and signaling through network applications 406. Network applications 406 direct CPU circuitry 405 to transfer the DL data from memory circuitry 405 over data com circuitry 401 to links 161-163.

Figure 5:
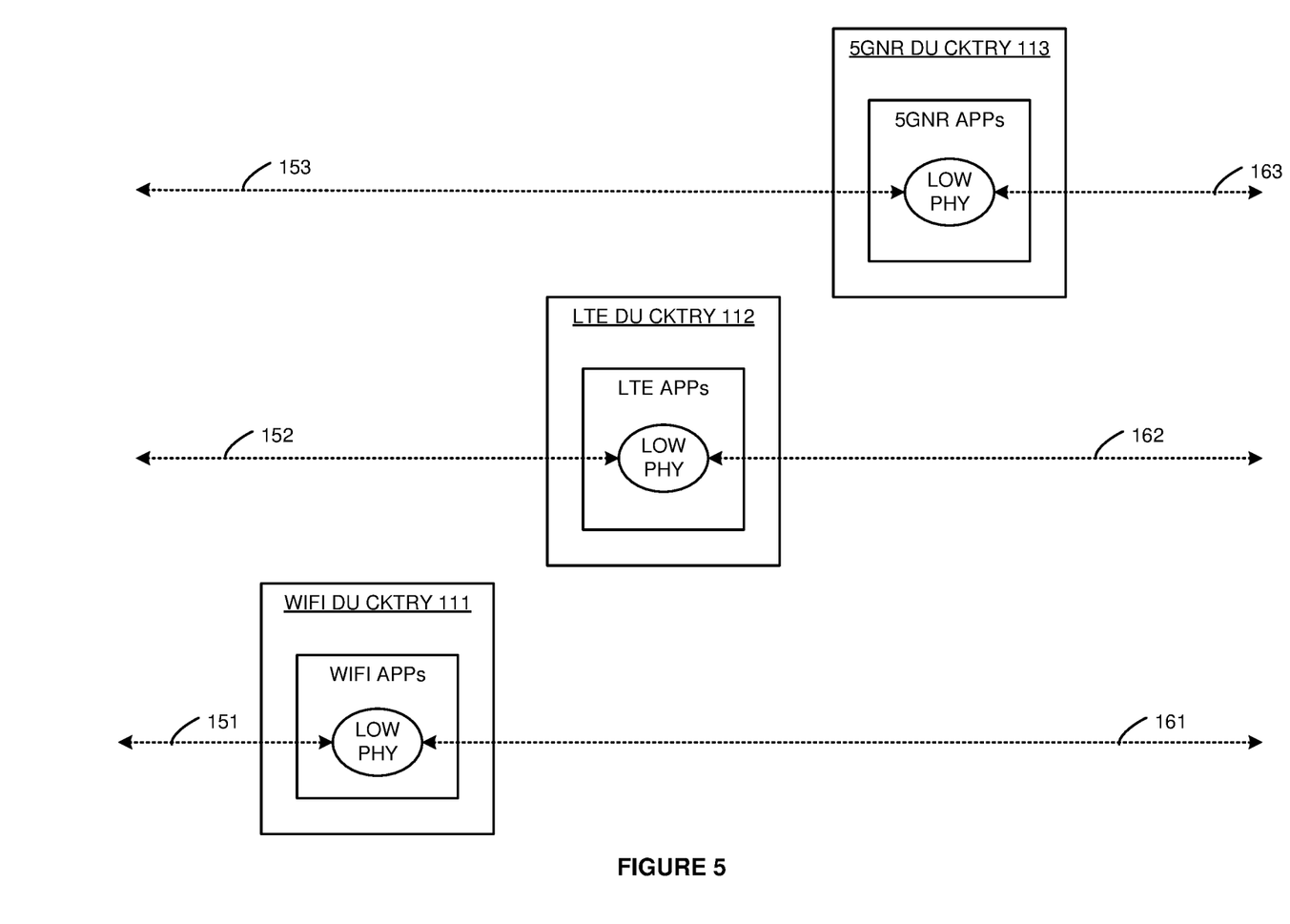
FIG. 5 illustrates the multi-RAT DU circuitry with a PHY split.

FIG. 5 illustrates DU circuitry 111-113 with a PHY split. WIFI DU circuitry 111 has WIFI apps that comprise the lower WIFI Physical Layer (PHY-L) modules. LTE DU circuitry 112 has LTE apps that comprise the LTE PHY-L modules. 5GNR DU circuitry 113 has 5GNR apps that comprise the 5GNR PHY-L modules. The PHY-L modules that are being executed by the CPU circuitry in DU circuitry 111-113 are referred to as PHY-L components.

The WIFI PHY-L component exchanges WIFI data and WIFI signaling with WIFI UE 101 over WIFI link 151. The WIFI PHY-L component also exchanges WIFI data and WIFI signaling with a WIFI PHY-H in multi-RAT CU circuitry 114 over network link 161. The WIFI PHY-L component performs lower PHY functions like packet formation/deformation, windowing/de-windowing, guard-insertion/guard-deletion, and Fast Fourier Transforms (FFTs)/ Inverse FFTs (IFFTs). In some examples, the WIFI PHY-L component performs data mapping/de-mapping, interleaving/de-interleaving, parsing/de-parsing, and/or Forward Error Correction (FEC) encoding/decoding.

The LTE PHY-L component exchanges RRC data, RRC signaling, and NAS signaling with LTE UE 102 over LTE link 152. The LTE PHY-L component also exchanges RRC data and RRC signaling with an LTE PHY-H in multi-RAT CU circuitry 114 over network link 162. The LTE PHY-L component performs lower PHY functions like IFFT/FFT and control insertion/removal. In some examples, the LTE PHY-L component performs Resource Element (RE) mapping/de-mapping, precoding, layer mapping/de-mapping, modulation mapping de-mapping, channel estimation, channel equalization, and Inverse Discrete Fourier Transforms (IDFT).

The 5GNR PHY-L component exchanges RRC data, RRC signaling, and N1 signaling with 5GNR UE 103 over 5GNR link 153. The 5GNR PHY-L component also exchanges SDAP data and RRC signaling with the 5GNR PHY-H in multi-RAT CU circuitry 114 over network link 163. The 5GNR PHY-L component performs lower PHY functions like IFFT/FFT and control insertion/removal. In some examples, the 5GNR PHY-L component performs RE mapping/de-mapping, precoding, layer mapping/de-mapping, modulation mapping de-mapping, channel estimation, channel equalization, and IDFT.

Figure 6:
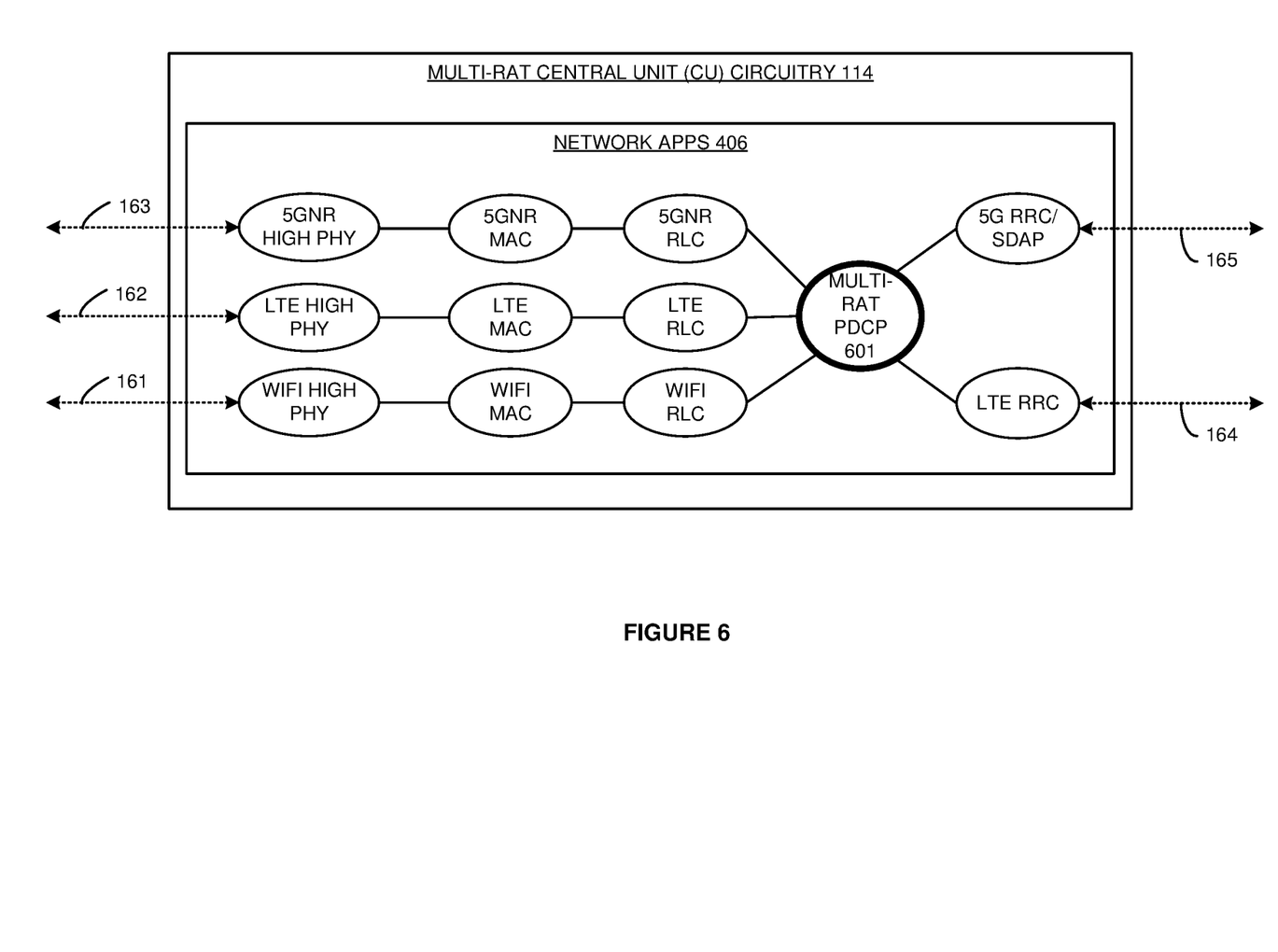
FIG. 6 illustrates the multi-RAT CU circuitry with a PHY split.

FIG. 6 illustrates multi-RAT CU circuitry 114 with a PHY split. CU circuitry 114 has network apps 406 that comprise the higher PHY layers (PHY-H) for WIFI, LTE and, 5GNR. Network apps 406 also comprise WIFI, LTE, and 5GNR modules for Media Access Control (MAC) and Radio Link Control (RLC). Network apps 406 further include modules for LTE Radio Resource Control (RRC), 5GNR RRC, 5GNR Service Data Adaption Protocol (SDAP), and multi-RAT Packet Data Convergence Protocol (PDCP) 601. The PHY-H, MAC, RLC, PDCP, RRC, and SDAP modules that are being executed by CU circuitry 114 are referred to as components.

The WIFI PHY-H component performs scrambling/descrambling. In some split-PHY examples, the WIFI PHY-H component also performs FEC encoding/decoding, parsing/ de-parsing, interleaving/de-interleaving, and/or data mapping/de-mapping. The WIFI MAC component processes user data to map between the WIFI MAC transport channels and MAC logical channels. The WIFI RLC component maps between the MAC logical channels and Protocol Data Units (PDUs). The WIFI RLC component exchanges WIFI PDUs with multi-RAT PDCP 601.

The LTE PHY-H component performs channel coding/ decoding, rate matching/de-matching, and scrambling/descrambling. In some split-PHY examples, the LTE PHY-H component performs modulation mapping/de-mapping, layer mapping/de-mapping, IDFT, channel estimation, channel equalization, precoding, and RE mapping/de-mapping. The LTE MAC component determines buffer status, power headroom, channel quality, Hybrid Automatic Repeat Request (HARQ) acknowledgements, UE identifiers, and the like. To perform HARQ on the UL, the LTE MAC component transfers ACKs for UL data and signaling for to LTE UE 102. To perform random access, the LTE MAC component processes access signaling from UE 102 to identify UE 102 and initiate scheduling for UE 102. To perform power control, the LTE MAC component processes channel quality and power headroom to adjust UE power to overcome poor channel quality within headroom and interference limits. To perform scheduling, the LTE MAC component processes radio channel quality, buffer status, and radio interference to assign data and signaling to wireless payloads. The LTE MAC component signals the schedule to LTE UE 102. In most cases, the LTE MAC component processes performance data like data-rate, delay, error-rate, and jitter to maintain Quality-of-Service (QoS) for LTE UE 102 over wireless link 152. The LTE RLC component maps between the MAC logical channels and PDUs or RBs. The LTE RLC component performs ARQ for the UL data and signaling by transferring UL ACKs to LTE UE 102. The LTE RLC component performs ARQ for the DL by retransmitting DL data and signaling that was not properly received by LTE UE 102. The LTE RLC component exchanges RRC data, RRC signaling, and NAS signaling with multi-RAT PDCP 601.

The 5GNR PHY-H component performs channel coding/ decoding, rate matching/de-matching, and scrambling/descrambling. In some split-PHY examples, the 5GNR PHY-H component performs modulation mapping/de-mapping, layer mapping/de-mapping, IDFT, channel estimation, channel equalization, precoding, and/or RE mapping/de-mapping. The 5GNR MAC component maps between the MAC transport channels and MAC logical channels. The 5GNR MAC component multiplexes and demultiplexes data between the MAC transport channels and the MAC logical channels. The 5GNR MAC component also determines buffer status, power headroom, channel quality, HARQ acknowledgements, UE identifiers, and the like. To perform HARQ on the UL, the 5GNR MAC component transfers ACKs for UL data and signaling to 5GNR UE 103. To perform random access, the 5GNR MAC component processes access signaling from UE 103 to identify UE 103 and initiate scheduling for UE 103. To perform power control, the 5GNR MAC component processes channel quality and power headroom to signal UE 103 and adjust UE power to overcome poor channel quality within headroom and interference limits. To perform scheduling, the 5GNR MAC component processes radio channel quality, buffer status, and radio interference to assign wireless payloads that comprise combinations of time-period and frequency-band called resource blocks. The 5GNR MAC component signals the schedule to UE 103. In most cases, the 5GNR MAC component processes performance data like data-rate, delay, error-rate, and jitter to maintain QoS for 5GNR UE 103 over wireless link 153. The 5GNR RLC component maps between the MAC logical channels and PDUs/RBs. The 5GNR RLC component performs ARQ for the UL by transferring UL ACKs to UE 103. For the DL, the 5GNR RLC component performs ARQ by retransmitting data and signaling that was not properly received by 5GNR UE 103. The 5GNR RLC component adds sequence numbers on the DL and performs resequencing on the UL. The 5GNR RLC component performs segmentation and resegmentation. The 5GNR RLC component exchanges RRC data, RRC signaling, and N1 signaling with PDCP component 601.

Multi-RAT PDCP component 601 exchanges PDUs with the LTE RLC component, the WIFI RLC component, and the 5GNR RLC component. The WIFI PDUs carry WIFI data and signaling. The LTE PDUs carry RRC data, RRC signaling, and NAS signaling. The 5GNR PDUs carry RRC data, RRC signaling, and N1 signaling. Multi-RAT PDCP component 601 maps between the PDUs from the WIFI RLC component and from the LTE RLC component and Service Data Units (SDUs) for the LTE RRC component. Multi-RAT PDCP component 601 maps between the PDUs from the 5GNR RLC component and SDUs for the 5GNR RRC/SDAP component. Multi-RAT PDCP component 601 handles 5GNR security by applying ciphering. Multi-RAT PDCP component 601 performs header compression and decompression. Multi-RAT PDCP component 601 adds sequence numbers and re-orders received SDUs in their proper sequence. Multi-RAT PDCP component 601 eliminates duplicate UL data.

The LTE RRC component exchanges SDUs that carry RRC signaling, RRC data, and NAS signaling with Multi-RAT PDCP component 601. The LTE RRC component establishes and terminates data sessions for WIFI UE 101 and LTE UE 102. The LTE RRC exchanges S1-U data with a gateway in LTE core network 130 over communication links 164. The LTE RRC exchanges S1-MME signaling and the NAS signaling with MMEs in LTE core network 130 over communication link 164. The LTE RRC supports NAS messaging between LTE UE 102 and MMEs in LTE core network 130. The LTE RRC component directs the broadcast of system information over DU circuitry 111-112. The LTE RRC component transfers paging over DU circuitry 111 to UE 101 and over DU circuitry 112 to UE 102. The LTE RRC component handles security and key management. The LTE RRC component handles handover operations along with UE 102 and MMEs in LTE core network 130. The LTE RRC component manages UE reporting. The LTE RRC component manages UE QoS.

The 5GNR RRC component exchanges SDUs that carry RRC signaling, RRC data, and N1 signaling with Multi-RAT PDCP component 601. The 5GNR RRC component establishes and terminates data sessions for 5GNR UE 103. The 5GNR RRC SDAP exchanges N3 data with a User Plane Function (UPF) in 5GC network 131 over communication links 165. The 5GNR RRC exchanges N1 and N2 signaling with the AMF in 5GC network 131 over communication links 165. The 5GNR RRC component supports N1 messaging between 5GNR UE 103 and AMFs in 5GC network 131. The 5GNR RRC component directs the broadcast of system information over DU circuitry 113. The 5GNR RRC component transfers paging over DU circuitry 113 to 5GNR UE 103. The 5GNR RRC component handles security and key management. The 5GNR RRC component handles handover operations along with UE 103 and the AMF in 5GC network 131. The 5GNR RRC component manages UE reporting. The 5GNR RRC component establishes and terminates data sessions for 5GNR UE 103. In the 5GNR RRC, the SDAP component maps between the SDUs for the 5GNR PDC component and QoS flows for 5GC network 131. The SDAP component marks UL QoS flows with the proper QoS and transfers the UL QoS flows to 5GC network 131 over communication links 165. The SDAP component receives marked DL QoS flows from 5GC network 131 over communication link 165.

Advantageously, multi-RAT PDCP component 601 converts between 5G N2 signaling and LTE S1-MME signaling. Multi-RAT PDCP component 601 converts between 5G N1 signaling and LTE Non-Access Stratum (NAS) signaling. Multi-RAT PDCP component 601 converts between 5G RRC signaling and LTE RRC signaling. Thus, multi-RAT PDCP component 601 interworks both data and signaling between any of the RLC components (5GNR, LTE, RLC) and any of the RRC components (LTE and 5GNR). In addition, multi-RAT PDCP component 601 performs higher layer PHY operations for WIFI, LTE, and 5GNR.

Figure 7:
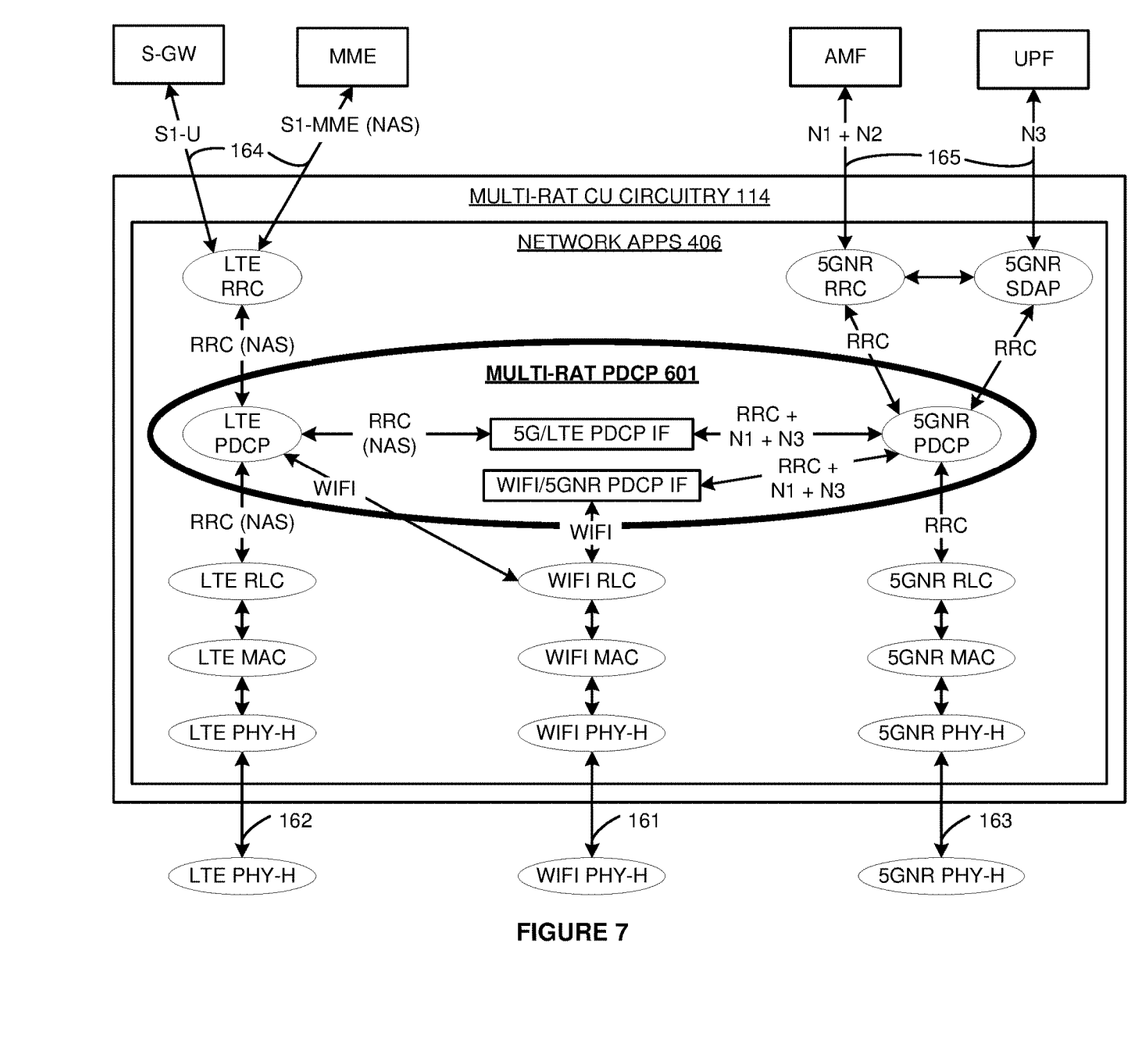
FIG. 7 illustrates a multi-RAT Packet Data Convergence Protocol (PDCP) in the CU circuitry.

FIG. 7 illustrates multi-RAT Packet Data Convergence Protocol (PDCP) component 601 in multi-RAT CU circuitry 114. Multi-RAT PDCP component 601 comprises an LTE PDCP component, 5GNR PDCP component, LTE/5GNR PDCP interface, and a WIFI/5GNR PDCP interface. The LTE RRC component exchanges S1-U data with an LTE Serving Gateway (S-GW) over communication link 164. The LTE RRC component exchanges S1-MME and NAS signaling with an LTE Mobility Management Entity (MME) over communication link 164. The LTE RRC component exchanges LTE RRC data and RRC/NAS signaling with the LTE PDCP component in multi-RAT PDCP 601.

The 5GNR SDAP component exchanges N3 data with a 5GC User Plane Function (UPF) over communication link 165. The 5GNR RRC component exchanges N1 and N2 signaling with a 5GC Access Mobility Function (AMF) over communication link 165. The 5GNR RRC component exchanges RRC signaling with the 5GNR PDCP component in multi-RAT PDCP 601. The 5GNR SDAP component exchanges RRC data with the 5GNR PDCP component in multi-RAT PDCP component 601.

In multi-RAT PDCP component 601, the LTE PDCP component exchanges RRC data and signaling (including NAS) with the LTE RLC component. The LTE PDCP component also exchanges WIFI data and signaling with the WIFI RLC component. The 5GNR PDCP component exchanges 5G RRC signaling and data with the 5GNR RLC component. The LTE/5GNR PDCP interface exchanges LTE RRC data and signaling (including NAS) with the LTE PDCP component. The LTE/5GNR PDCP interface exchanges 5GNR RRC signaling and data with the 5GNR PDCP component. The LTE/5GNR PDCP interface interworks between LTE RRC data and 5G RRC data. The LTE/5GNR PDCP interface interworks between LTE NAS signaling and 5G N1 signaling. The LTE/5GNR PDCP interface interworks between LTE RRC signaling and 5GNR RRC signaling. The WIFI/5GNR PDCP interface exchanges WIFI data and signaling with the WIFI RLC component.

The WIFI/5GNR PDCP interface exchanges 5G RRC/N1 signaling and N3 data with the 5GNR PDCP component. The WIFI/5GNR PDCP interface interworks between 5G RRC data and WIFI data. The WIFI/5GNR PDCP interface interworks between 5G RRC signaling and WIFI signaling.

The WIFI RLC component exchanges the WIFI data and signaling with the WIFI MAC component which exchanges the WIFI data and signaling with the WIFI PHY-H component. The WIFI PHY-H component exchanges the WIFI data and signaling with the WIFI PHY-L component in WIFI DU circuitry 111 over communication link 161. The LTE RLC component exchanges the LTE RRC data and signaling with the LTE MAC component which exchanges the LTE RRC data and signaling with the LTE PHY-H component. The LTE PHY-H component exchanges the LTE RRC data and signaling with the LTE PHY-L component in LTE DU circuitry 112 over communication link 162. The 5GNR RLC component exchanges the 5GNR data and signaling with the 5GNR MAC component which exchanges the 5GNR data and signaling with the 5GNR PHY-H component. The 5GNR PHY-H component exchanges the 5GNR data and signaling with the 5GNR PHY-L component in 5GNR DU circuitry 113 over communication link 163.

The LTE/5GNR PDCP interface hosts an LTE RRC data template and a corresponding 5G SDAP data template that maps data fields between LTE RRC data packets and 5G SDAP data packets. The LTE/5GNR PDCP interface hosts an LTE RRC signaling template and a corresponding 5G RRC signaling template that maps data fields between LTE RRC signaling packets and 5G RRC signaling packets. The LTE/5GNR PDCP interface hosts an LTE NAS data template and a corresponding 5G N1 data template that maps data fields between LTE NAS signaling messages and 5G N1 signaling messages. The WIFI/5GNR PDCP interface hosts a WIFI data template and a corresponding 5G SDAP data template that maps data fields between WIFI data packets and 5G SDAP data packets. The WIFI/5GNR PDCP interface hosts a WIFI signaling template and a corresponding 5G RRC signaling template that maps data fields between WIFI signaling packets and 5G RRC signaling packets. The WIFI/5GNR PDCP interface hosts another WIFI signaling template and a 5G N1 data template that maps data fields between WIFI signaling messages and 5G N1 signaling messages.

Figure 8:
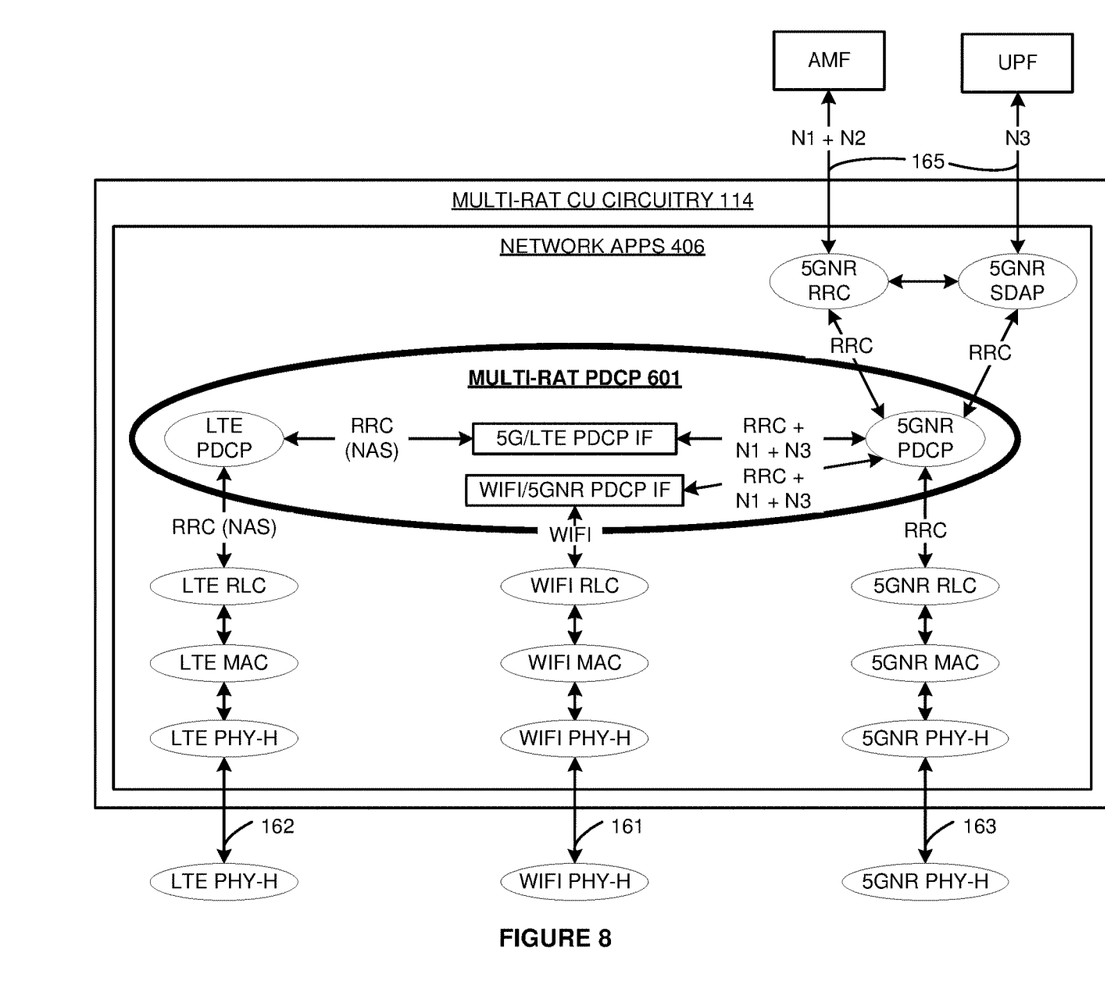
FIG. 8 illustrates the multi-RAT PDCP in the CU circuitry.

FIG. 8 illustrates another version of multi-RAT Packet Data Convergence Protocol (PDCP) component 601 and multi-RAT CU circuitry 114. The 5GNR SDAP component exchanges N3 data with a 5GC User Plane Function (UPF) over communication link 165. The 5GNR RRC component exchanges N1 and N2 signaling with a 5GC Access Mobility Function (AMF) over communication link 165. The 5GNR RRC component exchanges 5G RRC signaling with the 5GNR PDCP component in multi-RAT PDCP 601. The 5GNR SDAP component exchanges 5G RRC data with the 5GNR PDCP component in multi-RAT PDCP component 601.

In multi-RAT PDCP component 601, the LTE PDCP component exchanges RRC data and signaling (including NAS) with the LTE RLC component. The 5GNR PDCP component exchanges RRC signaling and data with the 5GNR RLC component. The 5GNR PDCP component exchanges RRC/N1 signaling and N3 data with the WIFI/5GNR PDCP interface. The LTE/5GNR PDCP interface exchanges LTE RRC data and signaling (including NAS) with the LTE PDCP component. The LTE/5GNR PDCP interface exchanges 5G RRC/N1 signaling and N3 data with the 5GNR PDCP component. The LTE/5GNR PDCP interface interworks between LTE RRC data and 5G RRC data. The LTE/5GNR PDCP interface interworks between LTE NAS signaling and 5G N1 signaling. The LTE/5GNR PDCP interface interworks between LTE RRC signaling and 5GNR RRC signaling. The WIFI/5GNR PDCP interface exchanges WIFI data and signaling with the WIFI RLC component. The WIFI/5GNR PDCP interface exchanges 5G RRC/N1 signaling and N3 data with the 5GNR PDCP component. The WIFI/5GNR PDCP interface interworks between 5G RRC data and WIFI data. The WIFI/5GNR PDCP interface interworks between 5G RRC signaling and WIFI signaling.

The WIFI RLC component exchanges the WIFI data and signaling with the WIFI MAC component which exchanges the WIFI data and signaling with the WIFI PHY-H component. The WIFI PHY-H component exchanges the WIFI data and signaling with the WIFI PHY-L component in WIFI DU circuitry 111 over communication link 161. The LTE RLC component exchanges the LTE RRC data and signaling with the LTE MAC component which exchanges the LTE RRC data and signaling with the LTE PHY-H component. The LTE PHY-H component exchanges the LTE RRC data and signaling with the LTE PHY-L component in LTE DU circuitry 112 over communication link 162. The 5GNR RLC component exchanges the 5GNR data and signaling with the 5GNR MAC component which exchanges the 5GNR data and signaling with the 5GNR PHY-H component. The 5GNR PHY-H component exchanges the 5GNR data and signaling with the 5GNR PHY-L component in 5GNR DU circuitry 113 over communication link 163.

The LTE/5GNR PDCP interface hosts an LTE RRC data template and a corresponding 5G SDAP data template that maps data fields between LTE RRC data packets and 5G N3 data packets. The LTE/5GNR PDCP interface hosts an LTE RRC signaling template and a corresponding 5G RRC signaling template that maps data fields between LTE RRC signaling packets and 5G RRC signaling packets. The LTE/5GNR PDCP interface hosts an LTE NAS data template and a corresponding 5G N1 data template that maps data fields between LTE NAS signaling messages and 5G N1 signaling messages. The WIFI/5GNR PDCP interface hosts a WIFI data template and a corresponding 5G SDAP data template that maps data fields between WIFI data packets and 5G N3 data packets. The WIFI/5GNR PDCP interface hosts a WIFI signaling template and a corresponding 5G RRC signaling template that maps data fields between WIFI signaling packets and 5G RRC signaling packets. The WIFI/5GNR PDCP interface hosts another WIFI signaling template and a corresponding 5G N1 data template that maps data fields between WIFI signaling messages and 5G N1 signaling messages.

Figure 9:
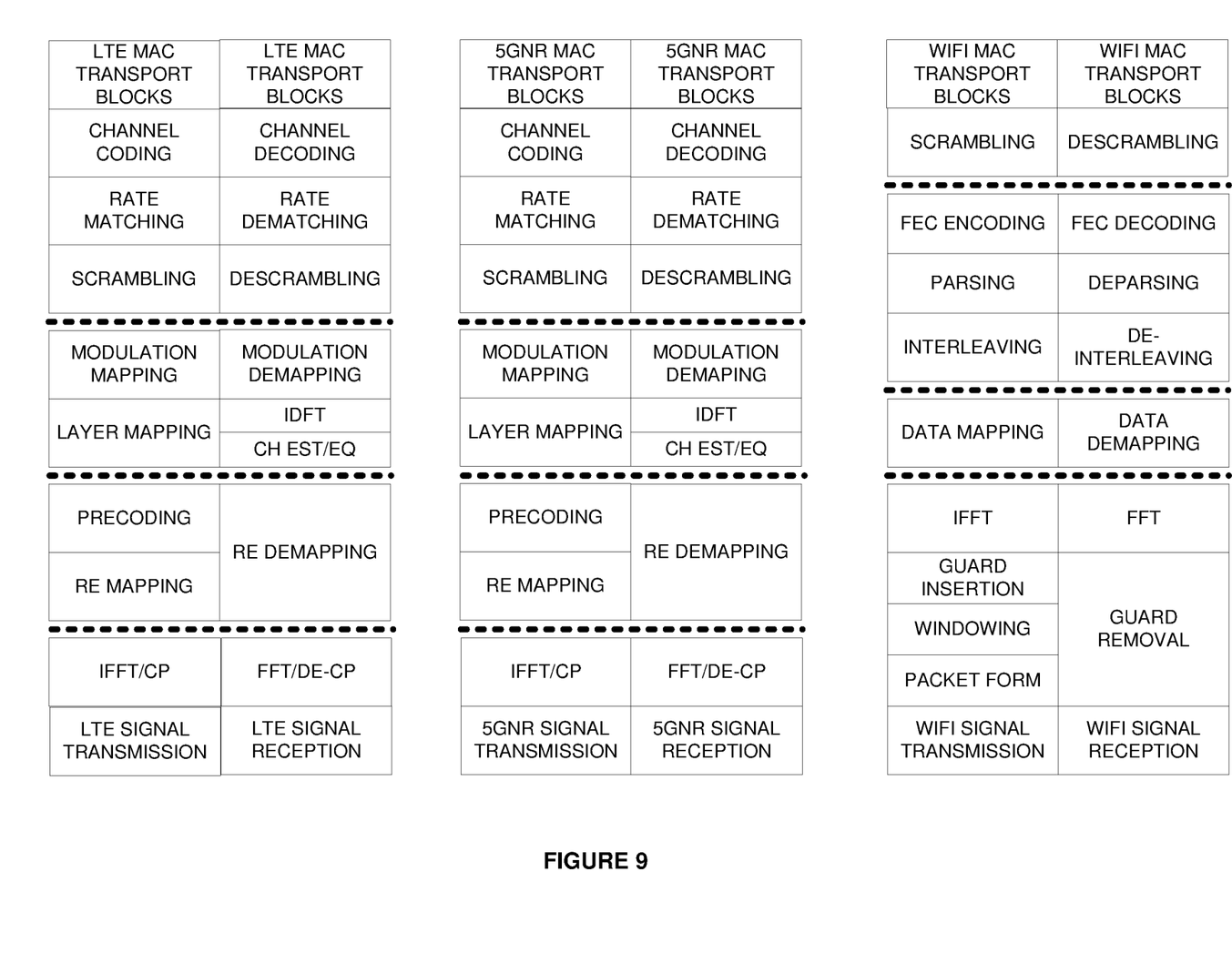
FIG. 9 illustrates DU/CU PHY split options.

FIG. 9 illustrates DU/CU PHY split options. The LTE PHY is shown on the left, the 5GNR PHY is in the middle, and the WIFI PHY is on the right. Within each PHY, the downlink is the left column and the uplink is the right column. The horizontal dotted lines indicate various PHY-split options for DU/CU circuitry 111-114. The PHY-split options for LTE, 5GNR, and WIFI may differ from one another. The PHY-split options for the uplinks and downlinks may differ from one another. The PHY-split options for different user equipment or session types may differ from one another.

On the downlink, the LTE PHY receives LTE MAC transport blocks and transmits wireless LTE signals. On the uplink, the LTE PHY receives wireless LTE signals and transmits LTE MAC transport blocks. The downlink LTE PHY comprises: channel coding, rate matching, scrambling, modulation mapping, layer mapping, precoding, Resource Element (RE) mapping, Inverse Fast Fourier Transform (IFFT) and Control Protocol (CP) insertion. The uplink LTE PHY comprises: FFT/de-CP, RE de-mapping, channel estimation and equalization, Inverse Discrete Fourier Transform (IDFT), modulation de-mapping, descrambling, rate de-matching, and channel decoding.

On the downlink, the 5GNR PHY receives 5GNR MAC transport blocks and transmits wireless 5GNR signals. On the uplink, the 5GNR PHY receives wireless 5GNR signals and transmits 5GNR MAC transport blocks. The downlink 5GNR PHY comprises: channel coding, rate matching, scrambling, modulation mapping, layer mapping, precoding, RE mapping, IFFT and CP insertion. The uplink LTE PHY comprises: FFT/de-CP, RE de-mapping, channel estimation and equalization, IDFT, modulation de-mapping, descrambling, rate de-matching, and channel decoding.

On the downlink, the WIFI PHY receives WIFI MAC transport blocks and transmits wireless WIFI signals. On the uplink, the WIFI PHY receives wireless WIFI signals and transmits WIFI MAC transport blocks. The downlink WIFI PHY comprises: scrambling, Forward Error Correction (FEC) encoding, parsing, interleaving, data mapping, IFFT, guard-band insertion, windowing, and WIFI packet formation. The uplink WIFI PHY comprises: guard-band removal, insertion, FFT, data de-mapping, de-interleaving, de-parsing, FEC decoding, and descrambling.

In a first LTE PHY split option, LTE DU circuitry 112 hosts an LTE PHY-L which comprises IFFT/CP and FFT/de-CP. Multi-RAT CU circuitry 114 hosts an LTE PHY-H which comprises: RE mapping/de-mapping, precoding, layer mapping, channel estimation and equalization, IDFT, modulation mapping/de-mapping, scrambling/descrambling, rate matching/de-matching, and channel coding/decoding.

In a second LTE PHY split option, LTE DU circuitry 112 hosts the LTE PHY-L which comprises: IFFT/CP and FFT/de-CP, RE mapping/de-mapping, and precoding. Multi-RAT CU circuitry 114 hosts the LTE PHY-H which comprises: layer mapping, channel estimation and equalization, IDFT, modulation mapping/de-mapping, scrambling/descrambling, rate matching/de-matching, and channel coding/decoding.

In a third LTE PHY split option, LTE DU circuitry 112 hosts the LTE PHY-L which comprises: IFFT/CP and FFT/de-CP, RE mapping/de-mapping, precoding, layer mapping, channel estimation and equalization, IDFT, modulation mapping/de-mapping. Multi-RAT CU circuitry 114 hosts the LTE PHY-H which comprises: scrambling/descrambling, rate matching/de-matching, and channel coding/decoding.

In a first 5GNR PHY split option, 5GNR DU circuitry 113 hosts a 5GNR PHY-L which comprises IFFT/CP and FFT/de-CP. Multi-RAT CU circuitry 114 hosts an 5GNR PHY-H which comprises: RE mapping/de-mapping, precoding, layer mapping, channel estimation and equalization, IDFT, modulation mapping/de-mapping, scrambling/descrambling, rate matching/de-matching, and channel coding/decoding.

In a second 5GNR PHY split option, 5GNR DU circuitry 113 hosts the LTE PHY-L which comprises: IFFT/CP and FFT/de-CP, RE mapping/de-mapping, and precoding. Multi-RAT CU circuitry 114 hosts the 5GNR PHY-H which comprises: layer mapping, channel estimation and equalization, IDFT, modulation mapping/de-mapping, scrambling/descrambling, rate matching/de-matching, and channel coding/decoding.

In a third 5GNR PHY split option, 5GNR DU circuitry 113 hosts the LTE PHY-L which comprises: IFFT/CP and FFT/de-CP, RE mapping/de-mapping, precoding, layer mapping, channel estimation and equalization, IDFT, modulation mapping/de-mapping. Multi-RAT CU circuitry 114 hosts the 5GNR PHY-H which comprises: scrambling/descrambling, rate matching/de-matching, and channel coding/decoding.

In a first WIFI PHY split option, WIFI DU circuitry 111 hosts a WIFI PHY-L which comprises: WIFI packet formation, windowing, guard-band insertion/removal, and IFFT/FFT. Multi-RAT CU circuitry 114 hosts a WIFI PHY-H which comprises data mapping/de-mapping, interleaving/de-interleaving, parsing/de-parsing, FEC coding/decoding, and scrambling/descrambling.

In a second WIFI PHY split option, WIFI DU circuitry 111 hosts a WIFI PHY-L which comprises: WIFI packet formation, windowing, guard-band insertion/removal, IFFT/FFT, and data mapping/de-mapping. Multi-RAT CU circuitry 114 hosts a WIFI PHY-H which comprises interleaving/de-interleaving, parsing/de-parsing, FEC coding/decoding, and scrambling/descrambling.

In a third WIFI PHY split option, WIFI DU circuitry 111 hosts a WIFI PHY-L which comprises: WIFI packet formation, windowing, guard-band insertion/removal, IFFT/FFT, data mapping/de-mapping, interleaving/de-interleaving, parsing/de-parsing, FEC coding/decoding. Multi-RAT CU circuitry 114 hosts a WIFI PHY-H which comprises scrambling/descrambling.

LTE and 5GNR channel coding implements FEC convolution coding and decoding, such as turbo coding and decoding. LTE and 5GNR rate matching/de-matching applies buffers to interface between data of different rates and data at a common rate. LTE and 5GNR scrambling encrypts/decrypts the data with spreading sequences. LTE and 5GNR modulation mapping converts between data bits and OFDM symbols using Quadrature Amplitude Modulation, Quadrature Phase Shift Keying, or some other scheme. LTE and 5GNR layer mapping interleaves and de-interleaves symbols. LTE and 5GNR precoding applies phase weighting and gain weighting. LTE and 5GNR RE mapping/de-mapping interface between the pre-coded symbols and OFDM REs. LTE and 5GNR IFFT and CP insertion converts the RE symbols into RE time signals and control information is added. LTE and 5GNR FFT and CP removal removes control information and converts RE time signals into RE symbols. LTE and 5GNR channel estimation and equalization measure channel characteristics and select gain and phase weights.

WIFI scrambling and descrambling removes and replaces long bit strings. WIFI channel coding and decoding implements FEC convolution coding and decoding. WIFI parsing and de-parsing separates and aggregates parallel data streams. WIFI interleaving and de-interleaving interfaces between symbols and code words. WIFI data mapping and de-mapping performs constellation mapping with QAM, QPSK, or the like. WIFI IFFT and FFT converts between time-domain signals and frequency-domain signals. WIFI guard-band insertion and removal adds and removes redundant data in between WIFI packets. WIFI windowing and de-windowing smooths the WIFI symbol flows. WIFI packet formation adds WIFI headers and preambles.

The multi-RAT CU circuitry described above comprises computer hardware and software that form a special-purpose machine—CU circuitry that processes user data and network signaling with the higher physical layers and with an integrated multi-RAT PDCP. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose CU circuitry that processes user data and network signaling with multi-RAT PHY-Hs and an integrated multi-RAT PDCP.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a Fifth Generation New Radio (5GNR) User Equipment (UE) and a Long Term Evolution (LTE) UE, the method comprising:
  a Central Unit (CU) hosting a 5GNR Physical Layer High (PHY-H) and hosting an LTE Physical Layer High (PHY-H);
  a 5GNR Distributed Unit (DU) hosting a 5GNR Physical Layer Low (PHY-L);
  an LTE Distributed Unit (DU) hosting an LTE Physical Layer Low (PHY-L);
  the CU receiving Fifth Generation Core (5GC) N2 signaling and responsively generating 5GNR RRC signaling;
  the CU receiving 5GC N1 signaling;
  the CU converting a first portion of the 5GNR RRC signaling into LTE RRC signaling and converting a first portion of the 5GC N1 signaling into LTE Non-Access Signaling (NAS);
  the LTE PHY-H hosted by the CU generating and transferring LTE PHY-H signaling to the LTE PHY-L hosted by the LTE DU;
  the 5GNR PHY-H hosted by the CU generating and transferring 5GNR PHY-H signaling to the 5GNR PHY-L hosted by the 5GNR DU;
  the LTE PHY-L hosted by the LTE DU receiving the LTE PHY-H signaling from the LTE PHY-H hosted by the CU, and in response, transferring the LTE RRC signaling and the LTE NAS signaling for wireless delivery to the LTE UE; and
  the 5GNR PHY-L hosted by the 5GNR DU receiving the 5GNR PHY-H signaling from the 5GNR PHY-H hosted by the CU, and in response, transferring the second portion of the 5GNR RRC signaling and the second portion of the 5GC N1 signaling for wireless delivery to the 5GNR UE.

2. The method of claim 1 wherein:
  the CU generating and transferring the LTE PHY-H signaling comprises LTE resource element mapping; and
  the LTE DU wirelessly transferring the LTE RRC signaling and the LTE NAS signaling to the LTE UE comprises performing LTE fast Fourier transforms.

3. The method of claim 1 wherein:
  the CU generating and transferring the 5GNR PHY-H signaling comprises 5GNR resource element mapping; and
  the 5GNR DU wirelessly transferring the 5GNR RRC signaling and the 5GC N1 signaling to the 5GNR UE comprises performing 5GNR fast Fourier transforms.

4. The method of claim 1 wherein:
  the CU generating the LTE PHY-H signaling comprises LTE resource element mapping;
  the CU generating the 5GNR PHY-H signaling comprises 5GNR resource element mapping;
  the LTE DU transferring the LTE RRC signaling and the LTE NAS signaling comprises performing LTE fast Fourier transforms; and
  the 5GNR DU transferring the 5GNR RRC signaling and the 5GC N1 signaling comprises performing 5GNR fast Fourier transforms.

5. The method of claim 1 wherein:
  the CU generating the LTE PHY-H signaling comprises LTE layer mapping; and
  the LTE DU transferring the LTE RRC signaling and the LTE NAS signaling to the LTE UE comprises LTE precoding.

6. The method of claim 1 wherein:
  the CU generating and transferring the 5GNR PHY-H signaling comprises 5GNR layer mapping; and
  the 5GNR DU transferring the 5GNR RRC signaling and the 5GC N1 signaling comprises 5GNR precoding.

7. The method of claim 1 wherein:
  the CU generating the LTE PHY-H signaling comprises LTE layer mapping;
  the CU generating the 5GNR PHY-H signaling comprises 5GNR layer mapping;
  the LTE DU transferring the LTE RRC signaling and the LTE NAS signaling comprises LTE precoding; and
  the 5GNR DU transferring the 5GNR RRC signaling and the 5GC N1 signaling comprises 5GNR precoding.

8. The method of claim 1 wherein:
  the CU generating the LTE PHY-H signaling comprises LTE scrambling; and the LTE DU transferring the LTE RRC signaling and the LTE NAS signaling to the LTE UE comprises LTE modulation mapping.

9. The method of claim 1 wherein:
the CU generating the 5GNR PHY-H signaling comprises 5GNR scrambling; and
the 5GNR DU transferring the 5GNR RRC signaling and the 5GC N1 signaling comprises 5GNR modulation mapping.

10. The method of claim 1 wherein:
the CU generating the LTE PHY-H signaling comprises LTE scrambling;
the CU transferring the 5GNR PHY-H signaling comprises 5GNR scrambling; and
the LTE DU transferring the LTE RRC signaling and the LTE NAS signaling comprises LTE modulation mapping; and
the 5GNR DU transferring the 5GNR RRC signaling and the 5GC N1 signaling comprises 5GNR modulation mapping.

11. A wireless communication network to serve a Fifth Generation New Radio (5GNR) User Equipment (UE) and a Long Term Evolution (LTE) UE, the wireless communication network comprising:
a Central Unit (CU) configured to host a 5GNR Physical Layer High (PHY-H) and hosting an LTE Physical Layer High (PHY-H);
a 5GNR Distributed Unit (DU) configured to host a 5GNR Physical Layer Low (PHY-L);
an LTE Distributed Unit (DU) configured to host an LTE Physical Layer Low (PHY-L);
the CU configured to receive Fifth Generation Core (5GC) N2 signaling and responsively generate 5GNR RRC signaling;
the CU configured to receive 5GC N1 signaling;
the CU configured to convert a first portion of the 5GNR RRC signaling into LTE RRC signaling and convert a first portion of the 5GC N1 signaling into LTE Non-Access Signaling (NAS);
the LTE PHY-H hosted by the CU configured to generate and transfer LTE PHY-H signaling to the LTE PHY-L hosted by the LTE DU;
the 5GNR PHY-H hosted by the CU configured to generate and transfer 5GNR PHY-H signaling to the 5GNR PHY-L hosted by the 5GNR DU;
the LTE PHY-L hosted by the LTE DU configured to receive the LTE PHY-H signaling from the LTE PHY-H hosted by the CU, and in response, transfer the LTE RRC signaling and the LTE NAS signaling for wireless delivery to the LTE UE; and
the 5GNR PHY-H hosted by the 5GNR DU configured to receive the 5GNR PHY-H signaling from the 5GNR PHY-H hosted by the CU, and in response, wirelessly transfer the second portion of the 5GNR RRC signaling and the second portion of the 5GC N1 signaling to the 5GNR UE.

12. The wireless communication network of claim 11 wherein:
the CU is configured to perform LTE resource element mapping; and
the LTE DU is configured to perform LTE fast Fourier transforms.

13. The wireless communication network of claim 11 wherein:
the CU is configured to perform 5GNR resource element mapping; and
the 5GNR DU is configured to perform 5GNR fast Fourier transforms.

14. The wireless communication network of claim 11 wherein:
the CU is configured to perform LTE resource element mapping and 5GNR resource element mapping;
the LTE DU is configured to perform LTE fast Fourier transforms; and
the 5GNR DU is configured to perform 5GNR fast Fourier transforms.

15. The wireless communication network of claim 11 wherein:
the CU is configured to perform LTE layer mapping; and
the LTE DU is configured to perform LTE precoding.

16. The wireless communication network of claim 11 wherein:
the CU is configured to perform 5GNR layer mapping; and
the 5GNR DU is configured to perform 5GNR precoding.

17. The wireless communication network of claim 11 wherein:
the CU is configured to perform LTE layer mapping and 5GNR layer mapping;
the LTE DU is configured to perform LTE precoding; and
the 5GNR DU is configured to perform 5GNR precoding.

18. The wireless communication network of claim 11 wherein:
the CU is configured to perform LTE scrambling; and
the LTE DU is configured to perform LTE modulation mapping.

19. The wireless communication network of claim 11 wherein:
the CU configured to perform 5GNR scrambling; and
the 5GNR DU configured to perform 5GNR modulation mapping.

20. The wireless communication network of claim 11 wherein:
the CU configured to perform LTE scrambling and 5GNR scrambling;
the LTE DU configured to perform LTE modulation mapping; and
the 5GNR DU configured to perform 5GNR modulation mapping.

* * * * *